Aug. 28, 1923.

T. F. HOLADIA 1,466,398

FERTILIZER DISTRIBUTOR

Filed June 7, 1922

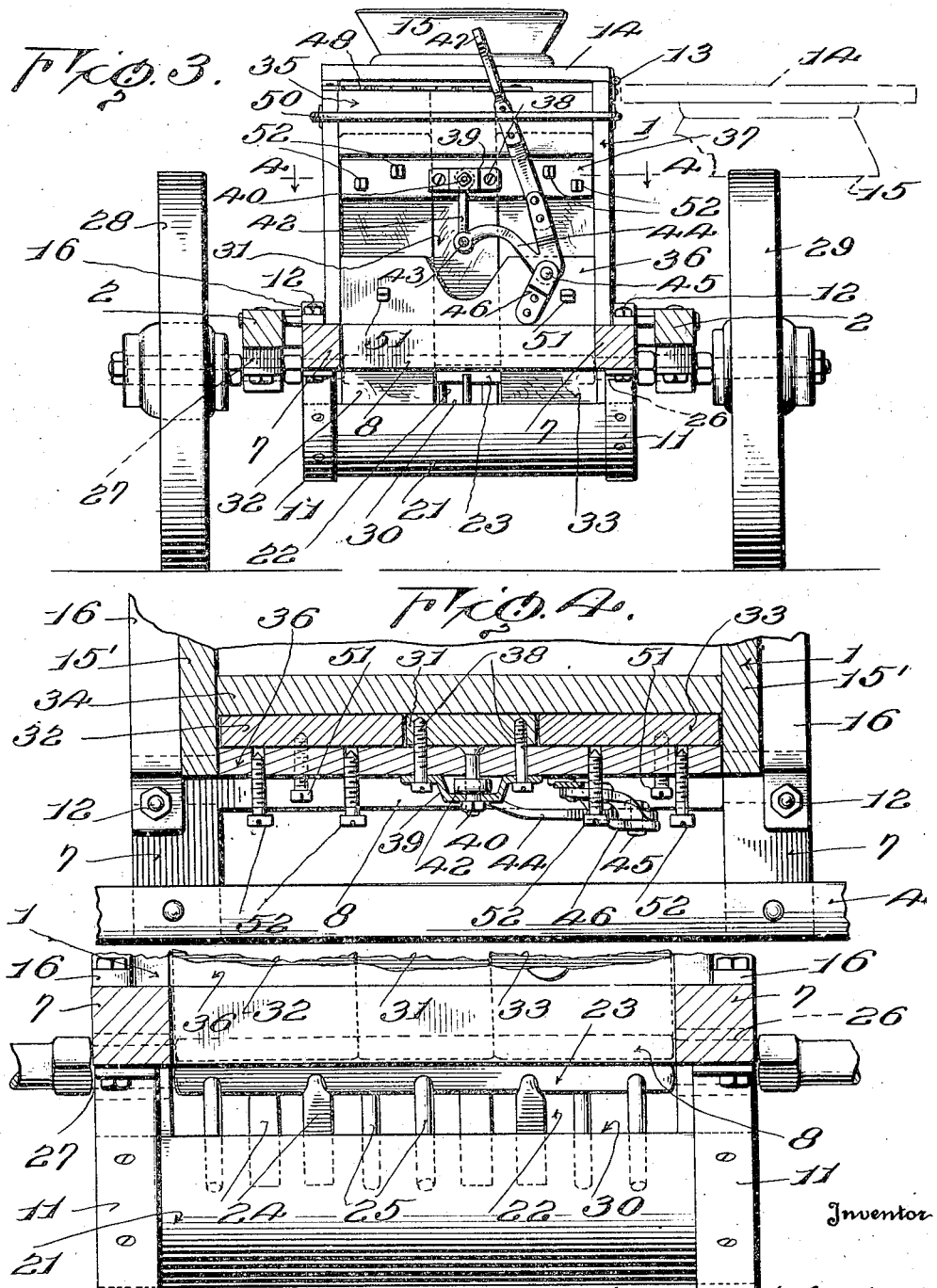

Patented Aug. 28, 1923.

1,466,398

UNITED STATES PATENT OFFICE.

THOMAS F. HOLADIA, OF COLUMBIA, NORTH CAROLINA, ASSIGNOR OF ONE-HALF TO JAMES G. BRICKHOUSE, OF COLUMBIA, NORTH CAROLINA.

FERTILIZER DISTRIBUTOR.

Application filed June 7, 1922. Serial No. 566,670.

*To all whom it may concern:*

Be it known that I, THOMAS F. HOLADIA, a citizen of the United States, residing at Columbia, in the county of Tyrell and State of North Carolina, have invented certain new and useful Improvements in Fertilizer Distributors, of which the following is a specification.

My invention relates to improvements in fertilizer distributors, and generally stated contemplates the provision of a mobile hopper or container having means for effectively discharging the fertilizing materials in an even and regulated manner.

An object of the present invention is to provide in combination a material receiving hopper having a rear end discharge opening near the bottom of the hopper, means for forcing the material from the rear of the hopper, and a plurality of gate or valve closures forming the rear wall of the hopper and capable of either joint or independent movement, whereby the fertilizing materials discharged may be regulated in accordance with the kind of produce to be raised in the ground being fertilized.

Another object of my invention is to provide a relatively tall mobile hopper or container for a fertilizer distributor having a filling opening closed by a hinged door at the top of the hopper, and a bottom wall for said hopper formed of contiguous inclined and curved sections arranged and associated with means for breaking the clods and forcing the material outwardly through an opening adjacent the curved portions of the bottom wall at the rear of the hopper.

A further object of the invention consists in providing a strong, durable and inexpensively constructed fertilizer distributor capable of being easily operated and readily repaired.

With these and other objects in view my invention further consists in the construction and arrangement of the several parts hereinafter described and pointed out in the claims.

In the accompanying drawings illustrating an embodiment of my invention as now known and practiced by me, Fig. 1 is a vertical longitudinal sectional view through my improved distributor;

Fig. 2 is a top plan view thereof with the top closure or lid removed and the position thereof when swung back indicated by the dot and dash lines;

Fig. 3 is a rear elevation of the distributor with parts in section (see line 3—3 of Fig. 1), the intermediate or central valve or gate portion of the rear wall being shown elevated for permitting the discharge of the material, and the hinged top cover being shown swung back in the dot and dash line position;

Fig. 4 is an enlarged horizontal sectional view on the line 4—4 of Fig. 3, the central valve or gate portion being shown engaged by the connecting screws, and the adjacent side valve or gate portions being shown disengaged by the screws and held relatively fixed against vertical movement; and Fig. 5 is an enlarged detail rear elevation of the lower portion of the hopper showing the several gate or valve portions forming the rear wall operably joined together for movement in unison to provide a comparatively large discharge opening across the rear of the distributor.

My present invention has been designed primarily for use as a mobile animal drawn distributor in which the shafts are inclined upwardly when attached to the animal so as to tilt the hopper and associated parts thereby providing for better gravitation of the material in the hopper and its discharge with comparative slight resistance through the opening at the rear. It will be understood however, that I do not limit myself to an animal drawn distributor or to the exact tilt imparted to the hopper, although in practice I have found this latter to be desirable.

Referring to the drawings in which similar reference characters designate corresponding parts in the several views, the hopper 1 is carried on a suitable supporting frame including outer longitudinal side bars 2—2 the forward ends thereof terminating in shafts 3 adapted to be connected to an animal as will be understood. A cross bar 4 unites the ends of the outer longitudinal bars 2—2 at the rear of the hopper, and a transversely arranged bar 5 joins the said longitudinal bars at the front of the hopper, and may form the support for the singletree (not shown). A tie rod 6 arranged between the front wall of the hopper and said transverse bar 5, serves to rigidly connect the longitudinal side bars.

The hopper 1 is constructed about a rectangular frame formed of the inner longitudinal side bars 7—7, and the transverse or cross bars 8—8, the upper portion 9 of the hopper being supported by and connected to said bars, and the lower portion 10 of the hopper being attached to the under side of said bars by means of the strap members 11—11 and bolt connections 12—12. Screw fastenings may also be provided to secure the straps to the bottom wall. The hopper is formed with an open upper end forming the filling opening over which is hinged at 13 a top closure or lid 14, said lid being preferably hinged to one side wall of the hopper so as to be capable of being easily swung back and out of the way of the associated parts of the distributor. A seat 15 is preferably attached to the top of the cover or lid as shown and provides a convenient and permanently available place for the operator to sit.

The side walls 15'—15' are vertically arranged in parallel relation to the outer and inner longitudinal side bars. other longitudinal bracing bars 16—16 being provided adjacent the outer faces of said side walls and secured to the top of the inner longitudinal bars 7—7 of the rectangular frame support by the bolts 12, and to the side walls 15 by means of fastening devices indicated at 17. The bars 16 provide rigidity for the hopper walls and laterally and longitudinally brace the hopper. The front wall of the hopper is indicated by the numeral 18.

The bottom of the hopper includes a short front wall 19 and the inclined portion 20 adapted to slope rearwardly and terminate in the arcuate or curved portion 21. The curved portion of the bottom wall is adjacent the inclined section as shown, and the contour of the curved wall portion is preferably concentric with the path of travel of the ejecting arms 22 of the material discharging means now to be described.

The means for forcing the fertilizer from the hopper comprises a series of radially arranged arms 22 carried by a rotating member or bar 23 operatively controlled by the movement of the distributor over the ground. The bars 22 are each preferably provided with a flat portion 24 and round portion 25, the respective portions being alternately arranged across the bar 23 as clearly shown in Fig. 2. The radially extending bars 22 are preferably secured in the supporting bar 23 by a driving or shrinking fit, or in any other suitable manner. The rotating bar 23 is provided with journal portions 26 and 27 respectively adapted to have a bearing in the opposite inner and outer longitudinally arranged side bars 2—2 and 7—7. The squared end of the bar 23 is carried into one of the supporting wheels 28 as shown by the dotted lines in Fig. 2, and provides for the transmitting of rotary movement to the material distributing means. The opposite supporting wheel 29 is freely mounted upon the rounded end portion of the bar 23 as shown in Fig. 2, thereby providing for the turning of the vehicle as will be understood. Adjacent the rotary distributing arms is the rear discharge opening indicated at 30, said opening being in its broadest sense the rear open end of the hopper, closed by a plurality of movable gates or slides to be now described.

The means for regulating the discharge of the fertilizing material, includes a central or intermediate valve-like slide 31, and adjacent cooperating valve-like slides 32 and 33. The several slides are vertically movable between outer and inner guide members, a transverse wall or partition 34 extending from and uniting the side walls 15 of the hopper, and serving to form an inner guide for said slides. Upper and lower transverse bars 35 and 36 respectively connect the opposite side walls 15 upon the outside of the slides and serve to form outer guide means for said slides.

The intermediate or centrally located slide 31 is shown in Fig. 4 connected to the transverse arm 37 by means of screws 38, said screws also serving to secure a plate 39 into which latter projects the outer end of a countersunk bolt 40. A nut 41 is threaded upon the end of the bolt 40 and serves to connect the plate 39 permanently to the transversely arranged and vertically movable bar or arm 37. One end of a link 42 is pivotally connected to the bolt 40, the opposite end of said link being connected at 43 to one arm of a bell crank 44 pivoted at 45 in a bracket 46 connected to the lower outer guide member 36. The other arm of the bell crank terminates in the hand lever 47 adapted to extend upwardly at the rear of the hopper and within easy reach of the operator from the seat. A notched bar 48 is provided for engaging and holding the lever 47 in its relative adjusted position, there preferably being a thin or spring-like portion formed on the lever 47 to provide for its retention within the respective notches. Screws 49 secure the notched or segmental bar to the top edge of the upper outer guide member 35. A retaining bar or bale 50 spans the side walls in spaced relation from the rear wall of the hopper, said bar acting to retain and guide the hand lever 47 as will be understood.

The adjacent cooperating slides or valve portions 32 and 33 arranged upon each side of the central slide 31, are each vertically movable within the guide members and as shown in Fig. 3 are arranged in relatively fixed position as rear wall closures between which and the central slide 31 is provided the relatively restricted opening 30 through which is forced a comparatively small or reduced amount of the fertilizer. The screws 51 carried by the lower outer guide 36 pass through said guide and extend into the respective slides 32 and 33, as shown in dotted lines in Fig. 4, and hold said slides in fixed relation with respect to the central slide 31, which latter can be raised or lowered to the desired height by the manipulation of the hand lever 47 as will be understood.

When it is desired to increase the size of the discharge opening so as to spread the discharge material over a greater area for example, the screws 52 carried by the vertically movable arm 37 are turned and moved into the respective slides 32 and 33 so that upon movement of the hand lever 47 all three slides, namely 31, 32 and 33 will be raised or lowered in unison and the material forced through a relatively wide opening across the rear of the hopper as shown in Fig. 5.

In operation, the movement of the distributor over the ground causes the wheel 28 to impart motion to the distributing or ejecting arms in the direction of the arrows shown in Fig. 1, said arms acting to move through the fertilizer material and force a portion thereof out through the discharge opening. The radial arms also provide a stirring means for keeping compost in a loose condition. They also act to reduce the clods of manure which might be mixed in the compost. It will be understood that various kinds of pulverized and other kinds of fertilizer can be distributed in an effective and even manner. It will also be apparent that a simple and effective regulation of the quantity of fertilizer distributed can be obtained according to the character of the ground being treated and the kind of vegetables, tobacco, or other produce which it is desired to grow.

I claim:

1. In a fertilizer distributor, the combination with a hopper having a rear discharge opening, means for forcing fertilizing material through and out of said opening, and means including a plurality of vertically movable slides for regulating the quantity of material discharged, some of said slides being operable together and at least one of said slides being capable of operation independently of the other of said slides.

2. In a fertilizer distributor, the combination with a hopper having a rear discharge opening, means for forcing fertilizing material through and out of said opening, and means for regulating the quantity of material discharged, said means including a centrally located slide member, operating means connected to said slide member, and adjacent cooperating slide members adapted to be connected to said last mentioned means for movement with said centrally located slide member.

3. In a fertilizer distributor, the combination with a hopper having a rear discharge opening, means for forcing fertilizing material through and out of said opening, a movable rear wall for said hopper formed of a plurality of separate sections, means connecting said sections together for movement in unison, and means for raising and lowering said connected sections.

4. In a fertilizer distributor, the combination with a hopper having a rear discharge opening, means for forcing fertilizing material through and out of said opening, a plurality of vertically movable slide members forming valves or gates for regulating the quantity of material discharged, guide means for said slide members, means for holding some of said slide members in relatively fixed position with respect to another of said slide members, and means for moving the slide member not held in said fixed position.

5. In a fertilizer distributor, the combination with a hopper having a rear discharge opening, means for forcing fertilizing material through and out of said opening, a plurality of independently and jointly movable slide members for regulating the discharge of fertilizing material, guide means for said slide members, means including a bar spanning said slide members and means carried by said bar adapted to enter said slide members for causing some or all of said slide members to move in unison, and means for moving said bars.

6. In a fertilizer distributor, the combination with a hopper having a rear discharge opening, means for forcing fertilizing material through and out of said opening, means including a plurality of movable sections for regulating the quantity of fertilizing material discharged, means for engaging and disengaging some of said sections for movement in unison, means for raising and lowering said sections, and means for holding said sections in elevated or lowered position.

7. A fertilizer distributor comprising a hopper having front and side walls, a bottom wall formed of contiguous inclined and curved portions, means rotatable in said curved portion for forcibly distributing the fertilizing material, and a rear wall having a plurality of movable sections adapted to regulate the amount of material discharged, said sections being vertically movable away from the upper portion of said curved section to form a discharge opening at the rear of the distributor adjacent the bottom thereof, and means for raising and lowering one of said sections.

8. A fertilizer distributor comprising a hopper having front and side walls, a bottom wall formed of contiguous inclined and curved portions, means rotatable in said curved portion for forcibly distributing the fertilizing material, and a rear wall having associated therewith a plurality of slide members adapted to regulate the amount of material discharged, said slide members being movable away from the upper adjacent edge of said curved bottom portion for forming a discharge opening adjacent the bottom of the hopper, and means for moving said slide members.

9. A fertilizer distributor comprising a hopper having a bottom wall formed of a rear curved portion and a sloping wall adjacent thereto, means located in said curved portion for forcibly ejecting the fertilizer materials, and a rear wall having associated therewith a plurality of sections having their lower edges adapted to contact the upper edge of said curved portion to form a rear closure for said hopper, and means for moving one or more of said sections to form a rear discharge opening adjacent the bottom curved portion.

10. A fertilizer distributor comprising a hopper having an open upper end, a hinged cover for said upper end, side walls, a front wall, a bottom wall having adjacent inclined and curved portions, means arranged in said curved portion for ejecting the fertilizing material, a movable slide member contacting the upper edge of said curved portion, and means for moving said slide member away from said curved portion to provide a discharge opening adjacent the curved bottom portion of the hopper.

In testimony whereof I affix my signature.

THOMAS F. HOLADIA.